United States Patent

[11] 3,608,660

| [72] | Inventors | Richard D. Smith<br>Palo Alto;<br>Dale A. Furlong, Menlo Park, both of Calif. |
|---|---|---|
| [21] | Appl. No. | 796,089 |
| [22] | Filed | Feb. 3, 1969 |
| [45] | Patented | Sept. 28, 1971 |
| [73] | Assignee | Combustion Power Company, Inc.<br>Palo Alto, Calif. |

[54] SMOG-FREE AUTOMOBILE AND METHOD OF OPERATING SAME
9 Claims, 19 Drawing Figs.

[52] U.S. Cl. .................................................. 180/54 B,
55/DIG. 30, 123/1 A, 123/25 C, 137/513.7, 280/5 A
[51] Int. Cl. ...................................................... B60k 15/08
[50] Field of Search............................................ 180/54, 1;
280/5 A; 296/1; 114/16 (.35); 294/1 (55); 123/19
E, 1 A, 25.2; 137/5, 13.7; 55/ET

[56] References Cited
UNITED STATES PATENTS

| 1,196,643 | 8/1916 | Bedford et al. ............... | 180/54 |
| 1,233,951 | 7/1917 | Alder ........................... | 123/25 (.2) UX |
| 1,496,951 | 6/1924 | Shinkle......................... | 123/119 E UX |
| 1,788,358 | 1/1931 | Goerg........................... | 137/513.7 |
| 2,183,674 | 12/1939 | Erren ........................... | 123/119 E UX |
| 2,487,176 | 11/1949 | Pitt et al. ...................... | 55/(ET) |
| 2,496,623 | 2/1950 | Fragale......................... | 123/119 (E) X |
| 2,623,725 | 12/1952 | Sands........................... | 137/513.7 X |
| 3,240,644 | 3/1966 | Wolff............................ | 220/3 X |

FOREIGN PATENTS

| 571,263 | 8/1945 | Great Britain................ | 280/5 A |

Primary Examiner—Benjamin Hersh
Assistant Examiner—Milton L. Smith
Attorney—Charles B. Smith ABSTRACT: A smog-free automobile is described burning fuel and substantially pure oxygen and spray water cooling the cylinder walls and pistons during exhaust. A dual combustion system is utilized, Otto cycle for cruise power and diesel cycle above cruise power, and water is recovered from the exhaust. The fuel can be pure hydrogen or liquid gasoline. With liquid gasoline, oxygen input atomizes the gasoline and with hydrogen fuel both hydrogen and oxygen can be produced by electrolysis, ideally utilizing nuclear electric generation for a complete smog-free system operation. Gaseous material is stored in a plurality of high-pressure vessels and in the case of hydrogen fuel with the pressure vessels at the rear of the auto. Separate sets of vessels are provided for cruise power supply and above cruise power supply and valving is provided to use the opposite set of tanks in case fuel for one operation is exhausted.

INVENTORS
RICHARD D. SMITH
DALE A. FURLONG

BY Limbach & Limbach
ATTORNEYS

INVENTORS
RICHARD D. SMITH
DALE A. FURLONG

BY Limbach and Limbach
ATTORNEYS

INVENTORS
RICHARD D. SMITH
DALE A. FURLONG

BY *Limbach and Limbach*
ATTORNEYS

INVENTORS
RICHARD D. SMITH
DALE A. FURLONG

BY *Limbach and Limbach*
ATTORNEYS

SMOG-FREE AUTOMOBILE AND METHOD OF OPERATING SAME

The present invention relates in general to smog-free automobiles and methods of operating same.

Control of air pollution is one of the most pressing problems facing industrial and population centers around the world today. The city dweller is being gradually poisoned with lethal doses of carbon monoxide, unburned hydrocarbons, and nitrogen oxides that pour from millions of exhausts from passenger cars and trucks that crowd the streets and highways in ever increasing numbers. Somewhere be 40 percent and 60 percent of the air pollution is caused by various forms of motor vehicle exhaust products.

The three major approaches currently being pursued to provide a pollution-free car are: (1) elimination of emissions from air-breathing internal combustion engines by means of catalytic filters, fuel additives, engine design, etc; (2development of an external combustion engine (gas turbine, Stirling engine, steam engine) to replace the current internal combustion engine; and (3) development of an electric car to replace current cars.

The first approach is being vigorously pursued by automotive manufacturers and major oil companies because, if successful, it would provide the minimum change to the automobile as we know it today. Difficult technical problems are anticipated and long-term laboratory research programs are in progress to find a technical breakthrough. One of the most difficult problems is to eliminate the oxides of nitrogen.

The external combustion engines under consideration require compromises in performance, convenience, or economy compared to current automobiles. They will be expensive to develop and will require drastic changes in the production tooling of the major automobile manufacturers. More importantly, however, they are not completely pollution-free.

Of the three approaches, the electric car is the only one which is completely pollution-free. Unfortunately, it is also the approach which requires the most research in order to provide car that meets today's standards of performance, comfort, and convenience.

Broadly stated, the present invention, to be described in greater detail below, is directed to a smog-free internal combustion engine and automobile therefor and method of operating same wherein the engine includes at least one cylinder, a piston reciprocating in the cylinder, and inlet ports and an exhaust port opened and closed cyclically as the piston reciprocates. The inlet ports include a fuel supply inlet, an inlet for substantially pure oxygen, and an inlet for water. Steps and means are provided for supplying controlled amounts of fuel and oxygen to the cylinder for substantially complete combustion of fuel therein and water spraying the cylinder and piston during the exhaust cycle. The engine burns either liquid gasoline or gaseous hydrogen with oxygen.

In accordance with this invention, an engine is provided which is completely smog-free. With hydrogen fuel, the only product of combustion is water and with liquid gasoline, the products of combustion are water, carbon dioxide and other nonpollutants.

The engine is produced with existing manufacturing technology and achieves current standards for performance, convenience, and economy. No unusual starting or warmup problems are introduced and periodic maintenance remains unchanged. Once in production, the car will cost about the same as a conventional gasoline engine family car and trips to the gas station will be of equivalent frequency and cost.

In accordance with another aspect of the present invention, a smog-free two-stroke internal combustion engine is provided, utilizing Otto cycle operation for cruise power and Diesel cycle operation for above-cruise power. With this construction and operation, an ideal engine is provided for a family sedan with maximum efficiency in the 25 to 50 horsepower range yet capable of maximum powers of 200 horsepower and a torque of 250 foot-pounds.

In accordance with still another aspect of the present invention, water is recovered from the engine exhaust and recycled for water cooling the cylinder and pistons during exhaust. A feature and advantage of the invention lies in the fact that water is the major combustion product of the gasoline or hydrogen fuel with pure oxygen so that cooling fluids are provided without requiring excessive cooling fluid storage in the car. The cooling fluids are regenerated during operation.

In accordance with still another aspect of the present invention, the hydrogen fuel and the pure oxygen for combustion of hydrogen are produced by the electrolysis of water. In electrolysis pure oxygen and hydrogen are produced in the precise ratio required for combustion such that only water is formed. This makes an efficient and easily operated pollution free system.

In accordance with still another aspect of the present invention, electrolysis of water for the production of the pure oxygen and hydrogen for combustion in the smog-free car is accomplished utilizing nuclear electric generation for accomplishing electrolysis of water. In this system, from the electric generation through the water electrolysis and through the combustion of hydrogen and oxygen in the internal combustion engine, no air pollutants are produced.

In accordance with still another aspect of the present invention where liquid gasoline is utilized as the fuel for the engine, the liquid gasoline is introduced in a stream into the engine cylinder and the stream is atomized by the oxygen directed into the cylinder for combustion. This operation and construction promote fast and uniform combustion.

In accordance with still another aspect of the present invention gaseous material for engine operation is stored in a plurality of high pressure tanks whereby the high-pressure gaseous material is not only economically stored but also safely stored. In the event one of the high-pressure tanks or any of the fluid conduits develops a leak, the other fluid tanks do not give up their stored material and danger of fire or explosion is avoided.

In accordance with still another aspect of the present invention substantially every storage tank of the plurality of storage tanks includes valve means preventing the rapid gaseous flow therefrom and a bleed valve permitting slow gaseous bleed from the tank whereby when a tank or manifold is ruptured, only a small amount of gaseous material is allowed to escape while the remaining gaseous material is slowly vented to permit repair of the system.

In accordance with still another aspect of the present invention, the storage tanks for storing he high pressure materials include a metal liner having a cylindrical main body portion and a cylinder wrap of fiberglass around the main body portion wherein the metal liner provides strong support against longitudinal loads and reasonable support against hoop stresses and the high strength glass fibers provide the necessary hoop stresses without the weight of metal to produce the equivalent hoop stresses. With this construction, in the event a pressure vessel is fractured due to accident, the fiberglass winding retains the integrity of the pressure vessel while allowing the gaseous materials to escape.

Other objects and advantages of this invention will become apparent when reading the following description and referring to the accompanying drawing in which similar characters of reference represent corresponding parts in each of the several views.

As set forth above, the present invention is directed to a smog-free internal combustion engine and method of operating same. It will be appreciated that this engine can be utilized for many purposes. However, this engine is ideally suited for propelling a smog-free automobile and in combination with other aspects of the present invention provides a smog-free system of vehicular travel. Therefore, the invention will be described in greater detail below as applied to a specific smog-free automobile and operational system.

Figure 1:
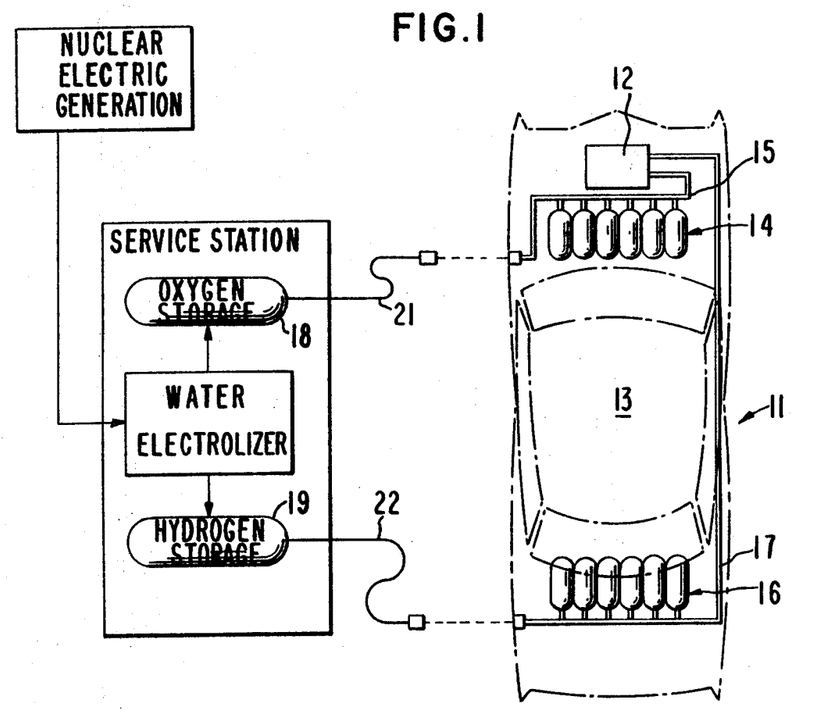
FIG. 1 is a schematic view partially in block diagram form and partially in plan schematically illustrating certain aspects of the present invention.
Figure 2:
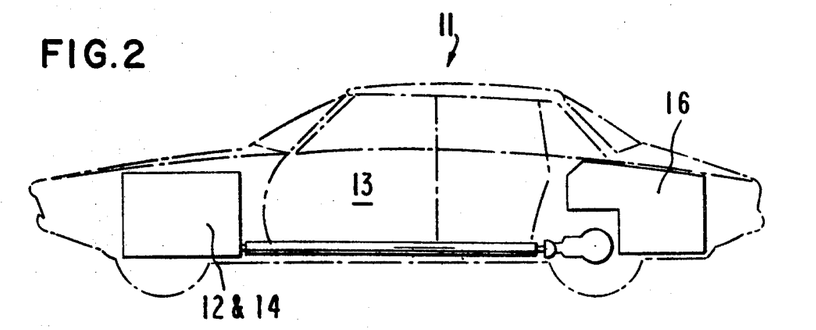
FIG. 2 is a schematic elevational view of the automobile illustrated in FIG. 1.

Referring now to the drawings with particular reference to FIGS. 1 and 2, a smog-free automobile 11 operating on combustion of gaseous hydrogen fuel and substantially pure oxygen includes a two-stroke internal combustion engine 12 conveniently located in the front of the vehicle and provided with substantially pure oxygen from a supply located adjacent thereto and gaseous hydrogen from a supply located rearwardly of the vehicle behind the passenger compartment 13. The oxygen supply consists of a plurality of high-pressure tanks 14 connected via a manifold 15 through pressure regulators and throttle valves (not shown) to the engine 12. Similarly, the hydrogen supply is contained in a plurality of high pressure vessels 16 connected via a manifold 17 through pressure regulating valves and throttle valves to the engine 12.

The automobile can be fueled at a service station with oxygen and hydrogen from high pressure storage tanks 18 and 19, respectively via quick disconnect, high pressure hoses 21 and 22, respectively.

The oxygen and hydrogen in storage tanks 18 and 19 can be generated at the service station in a unique high-pressure water electrolyzer 23 which will produce gaseous hydrogen and gaseous oxygen at the desired pressure and in the proportions needed for combustion in engine 12. While the energy for accomplishing water electrolysis can be provided by conventional electric utility power generating stations, this energy can be provided by nuclear electric stations which are air pollution free or fossil-fueled plants designed to meet air pollution requirements.

In the embodiment of the invention illustrated and described by illustrative example below, the engine 12 is less than one-third of the size of an equivalent gas engine and capable of being produced with convention internal combustion engine tooling.

From studies on present day driving habits, the ideal engine for the family sedan would provide maximum efficiency in the horsepower range of about 25 to 50 horsepower yet be capable of a maximum power of 200 horsepower and torque of 250 lb.-feet. Such a family car requires an energy storage of about 134 horsepower hours delivered to the wheels. These requirements are difficult to meet with a conventional gasoline engine. The maximum power output of a conventional gasoline engine is directly proportional to the weight flow of air. Therefor, at any given engine speed, power and torque are increased by increasing the displacement of the engine. Consequently, conventional engines for family sedans tend to have rather large displacements; 300 cubic inches is considered normal today. When these engines are operated at 25 to 50 horsepower which is a fraction of their maximum power, maximum gas temperatures and pressure in the cylinders are reduced greatly because of heat transfer to the large surface area within the combustion chamber thereby reducing thermal efficiency. With the engine in accordance with the present invention, high efficiency is accomplished in the usual 25–50 horsepower cruising range, sacrificing efficiency in the seldom used, high-power range.

Figure 3A:
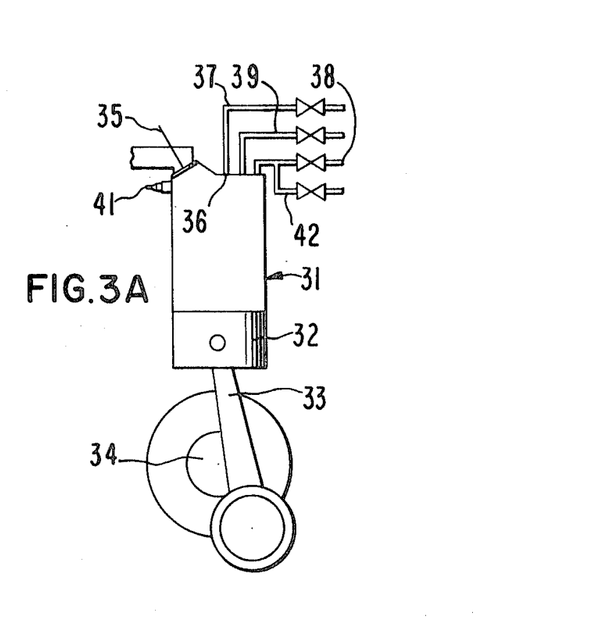
FIGS. 3A—E are schematic elevational views of the engine operation in accordance with this invention showing different piston positions.
Figure 3B:
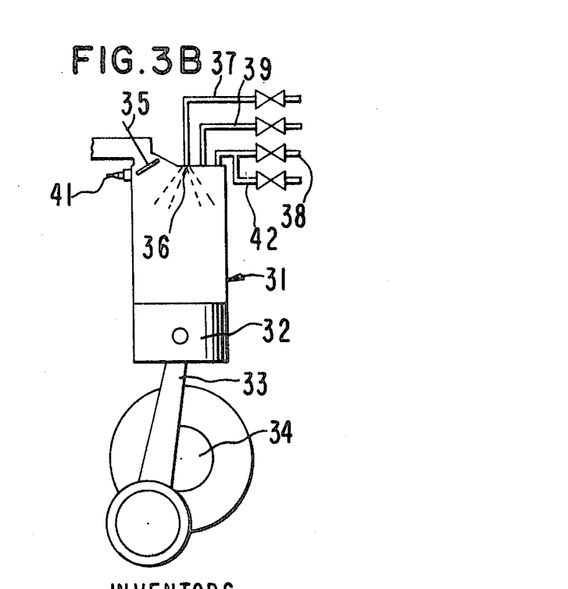

The engine in accordance with the present invention and its operation are unique in that an internal combustion engine is provided utilizing water vapor as the working fluid and employing internal water spray cooling of the cylinder walls. The operating cycle is a combination of the Otto cycle (constant volume combustion) and the diesel cycle (constant pressure combustion). The Otto portion of the engine cycle is used for power levels up to cruise power (40–50 horsepower); for maximum performance, the constant pressure combustion is employed subsequent to the constant volume combustion. Referring now to FIGS. 3A–3B, there is illustrated the cruise cycle portion of the engine in accordance with this invention.

With particular reference to FIG. 3A, there is shown one of the engine cylinders 31 including a working member or piston 32 therein connected via a connecting rod 33 to a drive shaft 34. The piston 32 is illustrated near the end of the power stroke after combustion of gaseous hydrogen and substantially pure oxygen. The products of combustion and the working fluid (both superheated water vapor) have been expanded, such as 20:1, and the exhaust valve 35 is about to open.

The exhaust valve 35 opens just before bottom dead center and the hot gas in the cylinder blows down to low pressure, the gas in the cylinder expanding adiabatically. Shortly after the blowdown of the hot gas in the cylinder, water injection is initiated through injector 36 at the closed end of the cylinder to cool the cylinder walls, pistons, and exhaust valve (see FIG. 3B). The exhaust valve 35 is left open until the piston has changed the volume ratio, such as where only a 5:1 volume ratio remains, and then the exhaust valve 35 is closed (see FIG. 3C). During this exhaust portion of the stroke, the piston 32 has scavenged the majority of the high temperature gas (water vapor) from the cylinder. Some of the gas will be cooled directly by vaporizing the injected liquid as it flies toward the wall. The water hitting the walls, piston crown, and exhaust valve will flash into low-temperature steam, mixing with the residual high-temperature water vapor and cooling it further. Some of this steam will pass out the exhaust valve along with the residual hot gas. At the time the exhaust valve is closed, the volume remaining above the piston in the cylinder is filled with saturated steam.

Figure 3C:
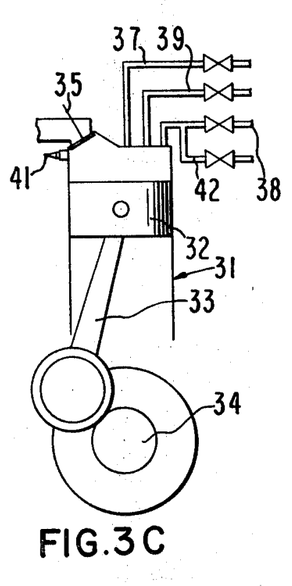

At the time of closing the exhaust valve 35, injection of gaseous oxygen and hydrogen from gas lines 38 and 39 respectively, is initiated. This injection occurs between closing of the exhaust valve and several degrees of crankshaft rotation before top dead center.

Figure 3D:
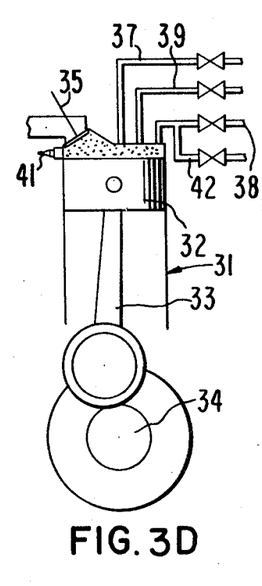
Figure 3E:
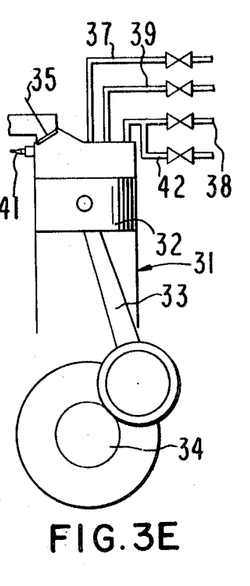

FIG. 3D shows ignition at top dead center where combustion begins and increases the pressure and temperature in the cylinder. Next, the hot gas (water vapor) is expanded 20:1 to provide the work output. The hot gas transfers heat to the walls which is removed on the exhaust upstroke by spray cooling.

To obtain maximum power, above the efficient cruise power range, the engine operation described is augmented by post ignition injection. FIGS. 3A–3D and FIG. 3E illustrative the various steps of this cycle. In this cycle, at the end of the power stroke (FIG. 3A) before the exhaust valve opens, the hot gas in the cylinder is at a temperature and at a pressure above that at the end of the cruise cycle power stroke. After the exhaust valve opens and the cylinder blows down, the hot gas in the cylinder expands adiabatically.

Water spray is initiated (FIG. 3B) at bottom dead center, as it was for the cruise cycle. The pressure of the water spray is increased to increase the flow rate because additional water will be required for cooling. After the closing of the exhaust valve 35 (FIG. 3C) and during the compression stroke, all of the hydrogen fuel is injected but only that portion of the oxygen is injected which is required for the reaction to reach a maximum cylinder pressure.

The conditions in the cylinder at the end of compression are similar to those of the cruise cycle, except that pressure is slightly greater due to the pressure of the additional hydrogen. Ignition occurs at top dead center by means of a spark ignition from spark plug 41 and the fuel rich mixture burns to produce hot gas. Concurrently, (FIG. 3E) a valve in a high-pressure oxygen line 42 is opened to supply additional oxygen to burn the remaining fuel at a constant pressure.

Since hydrogen has a spontaneous ignition temperature in air of 1085° F., hydrogen will exhibit characteristics for an engine "knock" standpoint similar to high-grade gasoline. Under circumstances where knock does occur and detonation becomes unavoidable, the hydrogen is injected on the upstroke as described above, but the oxygen injection is initiated shortly before top dead center and the hydrogen is progressively burned as the oxygen is admitted.

For a clear understanding of the present invention, the parameters of an illustration embodiment will be given and operating characteristics are shown in the pressure versus volume graph of FIG. 4. As shown at the end of the expansion stroke of the cruise cycle (FIG. 3A), the cylinder pressure is 39 p.s.i.a. and the water vapor temperature is 2720° F. at point 1 in FIG. 4. When the exhaust valve opens the gas expands adiabatically from 39 p.s.i.a. to 20 p.s.i.a. reducing the gas temperature to 2380° F. at point 2 in FIG. 4. At these temperatures, the speed of sound in water vapor is approximately 3,000 ft./sec. and it takes approximately 1/10 milliseconds for the pressure waves to reach the piston (or 3° of crankshaft rotation at 5,000 r.p.m.) before the flow starts out of the cylinder after the valve has first opened.

For providing the water spray during the exhaust stroke of the cycle the injector 36 at a port in the closed end of the engine cylinder can have a pressure differential of 120 p.s.i.a. from a water line 37 causing the water spray to attain a velocity of approximately 100 ft./sec. Consequently, approximately 2 milliseconds is required for a droplet to reach a point on the cylinder wall 3 inches from the top of the combustion chamber. At 5,000 r.p.m. this travel requires about 60° of crankshaft travel and if the water spray is initiated at bottom dead center, the droplet will reach the wall at the above referred to location shortly before the piston covers it.

At the time when the exhaust valve 35 closes (point 3 in FIG. 4), substantially only saturated steam at about 230° F. remains above the piston and compression begins.

The maximum pressure in the cylinder rises only to 165 p.s.i.a., consequently the back pressure against the gas during injection is minimal. Adiabatic compression of the steam at 230° F. (Over a 5:1 compression ratio) plus the introduction of hydrogen and oxygen results in a cylinder pressure of 165 p.s.i.a., and a gas temperature of 680° F. as shown at point 4 in FIG. 4. After ignition the cylinder pressure increased to about 1300 p.s.i.a. and the temperature of the gas therein to about 5180° F. (point 5 in FIG. 4). Then with expansion during the working stroke the pressure and temperature return to that at point 1 in FIG. 4.

In the maximum power or Diesel cycle operation the power stroke ends with a hot gas at a pressure of 71.5 p.s.i.a. and a temperature of about 3500° F. (point 1' in FIG. 4). Upon opening of the exhaust valve the hot gas in the cylinder expands adiabatically to a pressure of 20 p.s.i.a. and a temperature of 2760° F., and after the water spray and exhaust saturated steam remains at 230° F. and 20 p.s.i.a., the same conditions exist for the cruise cycle (point 3 in FIG. 4).

During compression and fuel and oxygen injection, only that part of the oxygen is injected to reach a maximum cylinder pressure of 1300 p.s.i.a. This results in an oxygen to fuel ratio of 2.6, well within the combustion limits. The overall oxygen to fuel ratio for hydrogen-oxygen combustion is O/F=8, the stoichiometric ratio.

After ignition the fuel rich hydrogen and oxygen mixture burns to produce hot gas at 1300° F. and additional high-pressure oxygen is injected to burn fuel at 1300 p.s.i.a. until all the hydrogen has burned and the hot gas reaches about 6000° F. (point 6 in FIG. 4)

Figures 4, 15:
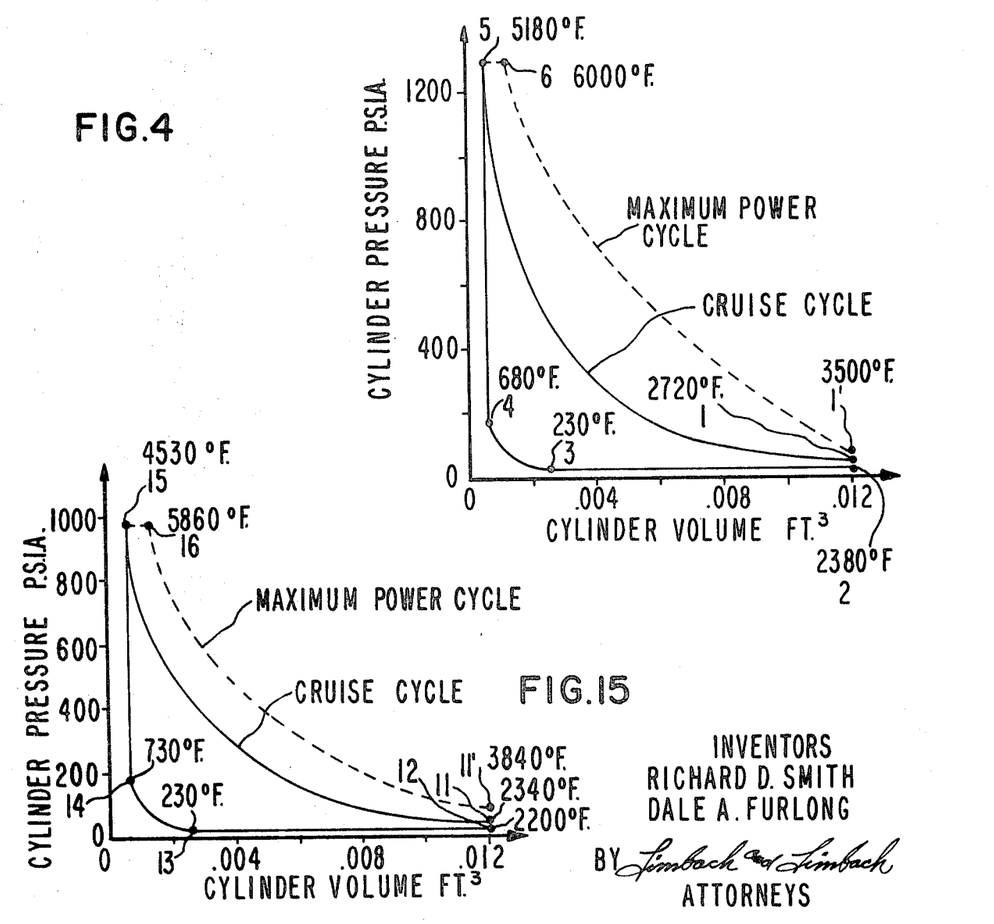
FIG. 4 is a graph of cylinder pressure vs. cylinder volume for one embodiment of the present invention.
FIG. 15 is a graph of cylinder pressure vs. cylinder volume for another embodiment of this invention.

At the start of the expansion stroke, the expansion ratio has been reduced from 20:1 to 8.15:1 by the previous constant pressure expansion shown at point 6 on the diagram of FIG. 4 for the maximum power cycle in addition to that of the cruise cycle. The engine as described produces 216 horsepower at 3000 r.p.m. when operating at conditions as discussed for the maximum power cycle.

Figure 5:
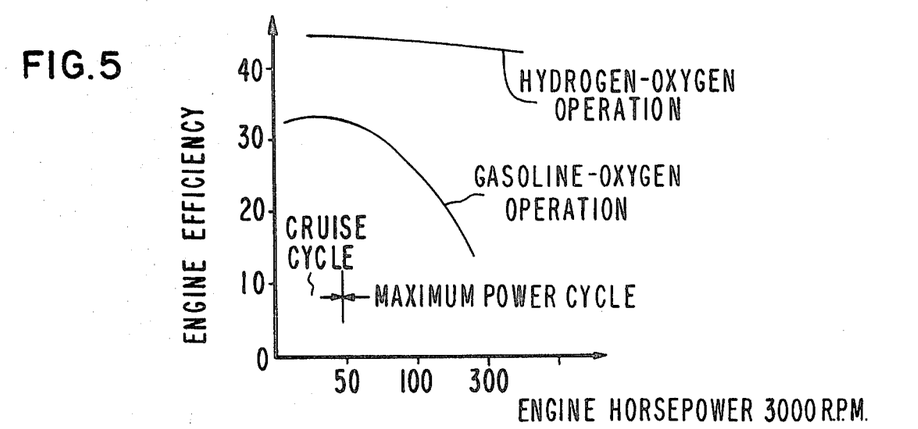
FIG. 5 is a graph of engine efficiency vs. horsepower for two embodiments of the present invention.

FIG. 5 illustrates the curve of the engine efficiency as a function of engine horsepower at a constant speed of 3000 r.p.m. The curve peaks at an efficiency of 45 percent at 60 horsepower (slightly more than required for normal driving) but drops off very little at the higher horsepower levels, with the maximum power cycle. One would normally expect a sharper drop off at the higher powers because the expansion ratio is greatly reduced due to the constant pressure portion of the cycle (post ignition injection). This trend toward lower efficiencies is off set by the increasing temperature of the hot gas in the cylinder, tending toward increasing the efficiency. High efficiency of this engine is due in large part to the excellent thermodynamic properties of water vapor as compared with carbon dioxide or air. The work obtained from a given weight of gas is inversely proportional to the molecular weight of the gas and while carbon dioxide and air have molecular weights of 44 and 29, respectively, the molecular weight of water vapor is 18.

Figure 6:
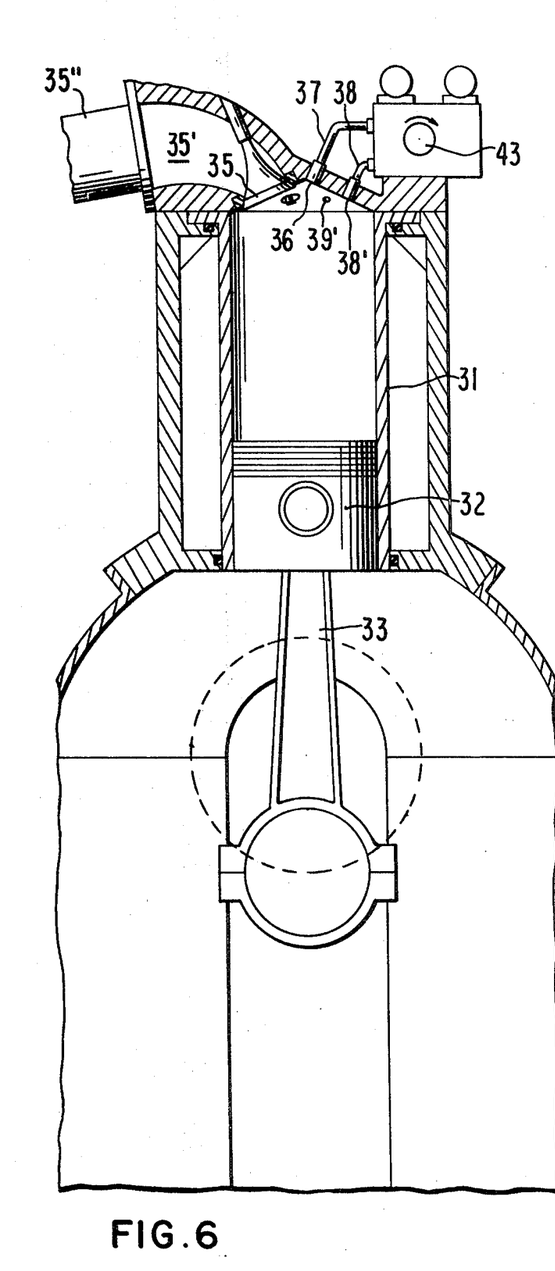
FIG. 6 is an elevational sectional view of a portion of an engine in accordance with the present invention.

A simplified side elevational sectional view of the smog-free engine is illustrated in FIG. 6. For the illustrative embodiment as described above, the two-stroke engine has four in-line cylinders each with a bore of 2.6 inches and a stroke of 4 inches. The exhaust is removed from the cylinder 31 through a single overhead valve 35 via exhaust port 35' and exhaust manifold 35'' with valve 35 operated by an overhead cam (not shown) driven by a toothed rubber belt. With an expansion ratio of 20:1, the volume of each combustion chamber is 1.04 cubic inches. The engine 12 uses the crankshaft from a conventional v-8 engine (4 inch stroke). The water spray injector 36, the oxygen and hydrogen inlet port 38' and 39' and the sparkplugs 41 are all located in the head 42. The water injector spray 36 is centered in the bore to provide a uniform spray to the cylinder walls. Water, hydrogen, and oxygen are metered by valves driven by an auxiliary cam such as shaft 43 in turn driven by a toothed belt (not shown). The hydrogen metering valves are separated from the oxygen and water metering valves to provide complete separation of the materials until injection into the combustion chamber. A typical engine constructed in accordance with the present invention is 27 inches long, 25 inches high, 15 inches wide, and weighs approximately 220 pounds.

The hydrogen and oxygen injected prior to ignition for the cruise portion of the cycle are injected over a crankshaft travel of about 45° for 1.5 milliseconds at 5000 r.p.m. The dwell angle of injection remains constant, and the amount of hydrogen and oxygen to be injected is determined by throttling upstream of the valve.

The oxygen injected after top dead center for maximum power is injected over a fixed dwell and of about 30° of crankshaft travel for 1 millisecond at 5000 r.p.m. With a back pressure of 1300 p.s.i.a., 300 p.s.i.a. pressure drop is provided through the valve. The oxygen is throttled upstream of the injection valve to provide throttling for maximum power and concurrent throttling of the hydrogen injected prior to dead center is also injected.

Figure 7:
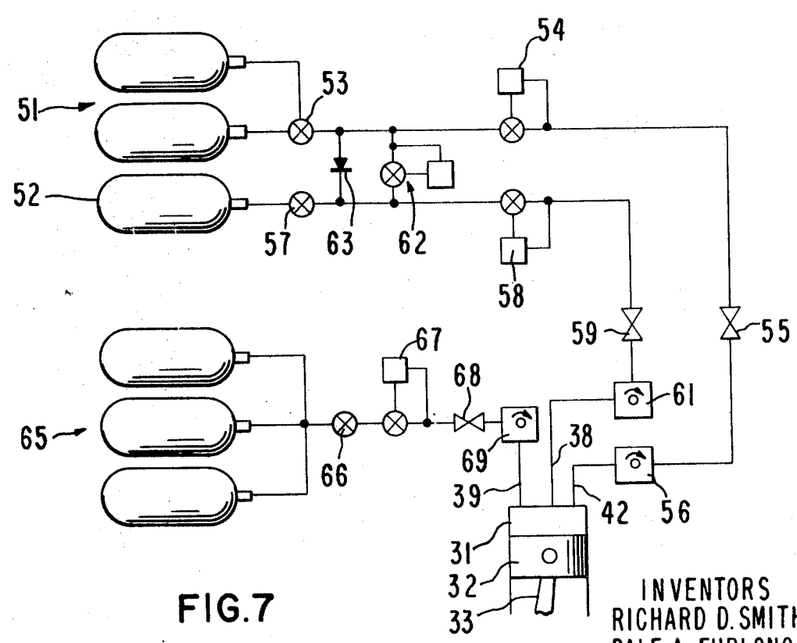
FIG. 7 is a diagram schematically illustrating the fluid supply system for an engine in accordance with the present invention.

FIG. 7 is a schematic view of the gas injection system for the engine described above. Both oxygen and hydrogen are stored initially such as at 5000 p.s.i.a. in high-pressure cylinders. The gas injection system of the illustrative embodiment utilizes the lowest possible gas injection pressure, 500 p.s.i.a. to take maximum advantage of the capacity of the storage tanks. If the pressure drops below the gas injection pressure, the engine begins to lose power, thereby warning the driver to stop at a service station and fill up. A special high pressure oxygen system is used for post ignition for the maximum power cycle.

As illustrated, the oxygen storage tanks are segregated into two groups, cruise oxygen tanks 51 and maximum power oxygen tanks 52. Typically, the cruise oxygen tanks are on the order of 90 percent of the tool supply. Cruise oxygen from tanks 51 goes through a shutoff valve 53 actuated by the ignition key and a pressure reducing regulator 54 to reduce the oxygen pressure to the approximately 500 p.s.i.a. referred to above. At the engine 12 oxygen passes through a throttling valve 55 controlled by the automobile accelerator (not shown) and the injection valve 56 to inject oxygen into the cylinder at the proper time of the cycle.

The oxygen from tanks 52 to provide maximum power goes through a shutoff valve 57 and a pressure reducing regulator 58 to a pressure, such a 1600 p.s.i.a., above the constant pressure level of the power cycle, and then through a throttle valve 59 and injection valve 61. To insure complete utilization of all oxygen, a valving assembly is provided for connecting the conduits of the cruise oxygen and power oxygen tanks 51 and 52, respectively, when either the pressure in the cruise oxygen tank line falls to 500 p.s.i.a. or the pressure in the power oxygen tank line falls to 1600 p.s.i.a. This valving assembly can include a regulator 62 which allows oxygen from tank 52 to bleed into the cruise tank line to maintain a pressure of 600 p.s.i.a. and a check valve allowing cruise tank oxygen to bleed into the maximum power oxygen line if the maximum power oxygen pressure drops below the cruise tank pressure.

The hydrogen system is similar to the cruise oxygen system including pressure tank 65, a shutoff valve 66, a pressure reducing valve 67, a throttle valve 68 and an injection valve 69 except throttle valve 68 is arranged to introduce additional hydrogen into the cylinder during the maximum power cycle.

The water injection spray head 36 is designed to provide a medium fine spray into the cylinder 31. If the spray is too fine, it will be evaporated in the gas and not reach the cylinder walls; if the spray is too coarse, it will not be distributed uniformly on the cylinder walls. Consequently, only nominal pressures, such as 120 p.s.i.a., are needed for the water spray nozzle.

In the particular illustrative embodiment given herewith, approximately 0.00015 pounds of water are required to cool the cylinder after each power stroke. Under maximum power this figure increases to 0.0004 pounds per stroke. While these figures appear insignificant, 86 pounds of water would be required for a 1 hour cruising. Consequently, a system is employed to condense a portion of the exhaust to supply distilled water for the injection system.

Figure 8:
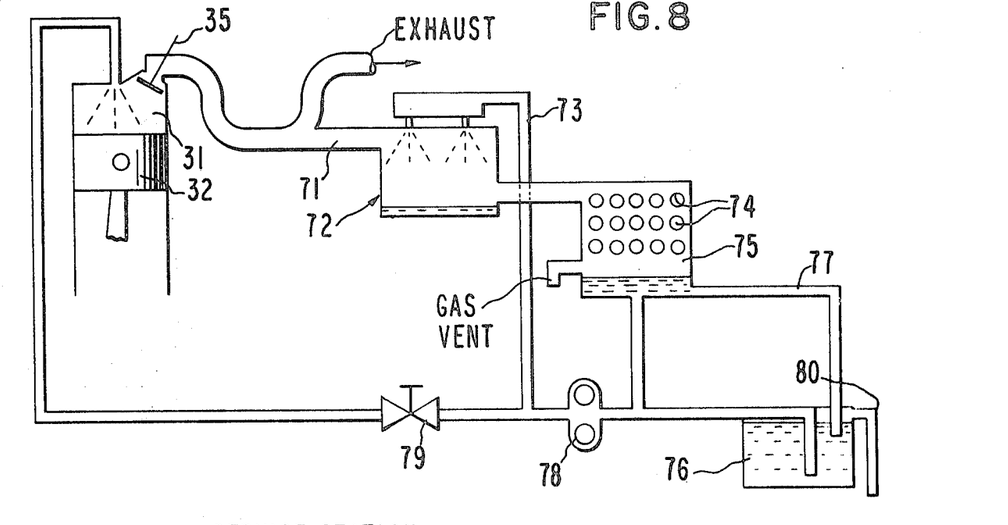
FIG. 8 is a drawing schematically illustrating the water spray and recovery system for this invention.

FIG. 8 presents a schematic diagram of the cooling water system of this invention. For the illustrative example given here the cooling system is sized to operate continuously for maximum cruise power. On each stroke, 0.00015 pounds of water are injected into cylinder 35 for cooling. 0.00032 pounds of steam at 2060° F. at atmospheric pressure are exhausted from the cylinder 31, the combustion of hydrogen and oxygen contributing to the water vapor. If less than 50 percent of the exhaust is directed to the atmosphere and the remainder directed via a line 71 to a desuperheater 72, sufficient water can be recovered for continuous operation of the engine with the water spray utilized during the exhaust stroke. In the desuperheater 72, water from a return line 73 is sprayed into the superheated stream, and the evaporation of this water cools the superheated stream to near saturation conditions. Utilizing water from the automobile radiator in circulation tube 74 of a condenser 15, the saturated steam can be condensed and returned to a reservoir 76 via a line 77. A pump 78 circulates water from the reservoir 76 to line 73 directed to the desuperheater and through a throttle valve 79 to the spray head 36 for the spray during the exhaust cycle. The reservoir 76 accommodates time when maximum power is required and during which slightly more water is used in operation than recovered. This lost water is recovered during cruise conditions and once the reservoir 76 is full, excess recovered water is allowed to exhaust via an overflow pipe 80.

In freezing climates a small hole is provided in the bottom of the reservoir allowing the water to leak out of the system when operation is complete. Similarly, the high-pressure line is vented at shut down to allow it also to drain. While no water is available for cooling at start up of the engine, none is needed in these freezing climates. The engine walls are chilled and the desuperheater and condenser are cold. Condensation collected in the system at start up will provide sufficient water to start the system into operation.

Figure 9:
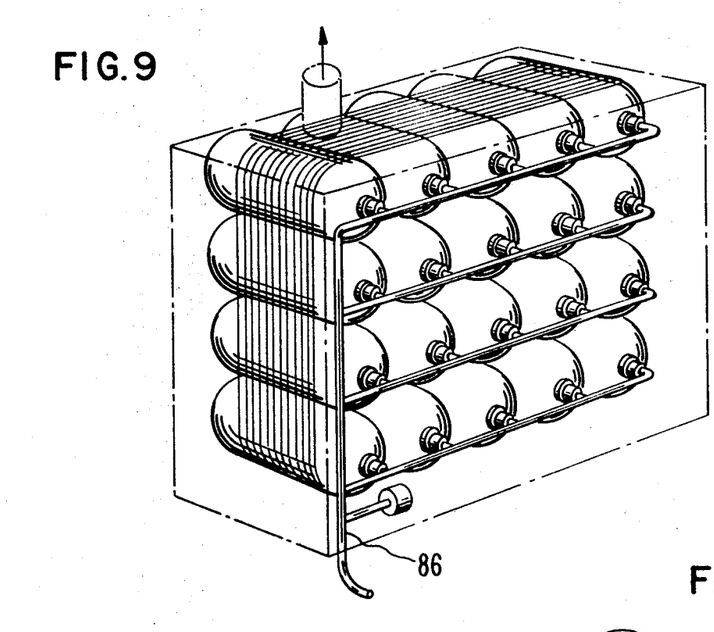
FIG. 9 is a perspective view of a tankage assembly of this invention.
Figure 10:
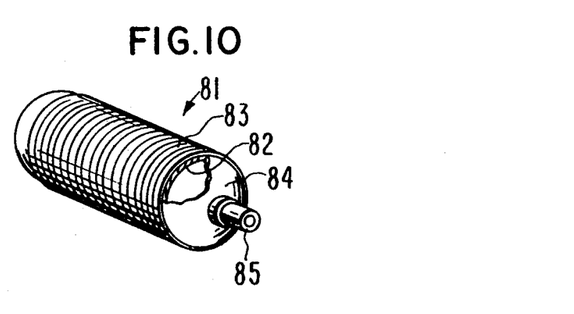
FIG. 10 is a perspective view of one tank, partially broken away, utilized in this invention.
Figure 11:
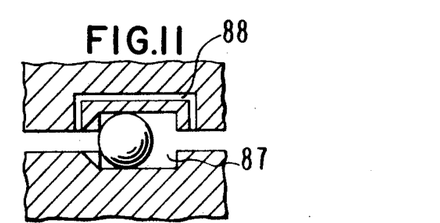
FIG. 11 is an enlarged sectional view of a tank valve used for this invention.

The assembly and construction of gaseous pressure tanks for storage of high pressure hydrogen and oxygen is illustrated in FIG. 9–11. As shown, each of the tanks 81 is formed of a composite structure having a liner 82 formed of a thin gauged steel overwound with a wrap of tensioned glass filament fibers 83. The ends of the liner 82 are closed with hemispherical members 84 and provided with a neck opening 85 in one end. Cylindrical vessels as the liner 82 essentially have tension stresses in two directions: those caused by the longitudinal load, and those caused by the circumferential load, referred to as hoop stresses. These hoop stresses are approximately twice as large as the longitudinal stresses. Since glass fiber filaments have several times the strength to weight ratio of steel, tanks 81 of composite structures for the high-pressure system in accordance with the present invention allow the placing of the high strength fibers in the direction of the load. This results in dramatically reduced weight and increased safety factors for the smog-free car. Should a composite vessel be fractured due to accident, the fiberglass lining wall in all probability retain the integrity of the pressure vessel while gas escapes.

For maximum safety consistent with reasonable cost and size, the hydrogen and oxygen high-pressure tank storage assembly utilizes clusters of small composite tanks 81 as shown in FIG. 9. The tanks each are lined with a material to protect steel from rusting or corrosion and the tank overwrapped with fiberglass tension windings to hold the cluster together in the presence of pressure forces that would be thrust on adjacent bottles during a period when gas is escaping.

In the typical illustrative example given on the present invention, tanks 20 inches long and 5.5 inches diameter holding 35 cubic inches of gas at 5000 p.s.i.a. are utilized.

Based upon the energy storage requirements of 134 horsepower hours discussed above and the hydrogen/oxygen engine average efficiency of 44 percent for normal driving, the gas storage and tankage requirements for the engine are 17 pounds of hydrogen and 153 pounds of oxygen. This amount of hydrogen can be stored in 61 of the tanks described and the oxygen in 34 of these tanks.

For safety sake, the hydrogen tankage and oxygen tankage are widely separated to preclude an accidental mixing of the gases due either to leakage or in the event of a severe collision. The hydrogen tanks are mounted in the forward part of the truck with a steel fire wall aft of the back seat to isolate the hydrogen tank storage from the passenger compartment. In this location, the hydrogen tanks are the least likely to be penetrated in the event of a violent crash. If penetrated, the hydrogen gas escapes rearward and upward and if a fire results, it is directed away from the passengers. Present cars mount their gasoline tanks in the rear for similar reason, and fires due to spilled gasoline are rare with injuries due to fire even more rare. The 61 tanks can be fitted into the truck area of existing cars and the 34 oxygen tanks mounted under the hood adjacent the engine.

Because of the tank weight and oxygen weight, this automobile is heavier than a comparable gasoline engine car. Reduction in the size of the engine compensates in part for the added tank weight of hydrogen and oxygen. The weight for an average conventional gasoline engine family car is approximately 3500 pounds with a weight distribution of 55 percent/45 percent between the front and back, respectively. The weight of the automobile in accordance with the present invention would be about 3925 pounds with a weight distribution of 45 percent/53 percent between front and back. The added weight on the back wheels adds traction in slippery weather and reduces wheel spin for heavier automobiles.

To prevent the hydrogen from all other tanks from going through the manifold 86 and escaping through a ruptured tank, each tank is equipped with a hydraulic fuse. The hydraulic fuse is in the form of a normally open check valve that permits rapid tank filling but only a limited flow rate leaving the tank such as would be experienced in normal use. If a failure occurs and rapid flow is initiated, the flow entrains a simple ball which closes the check valve and stops the flow. A small bleed line 88 bypassing the check valve is installed to allow the tank to slowly reduce in pressure, such as over the period of an hour or two, thereby decompressing the tanks to remove hazard in later disassembly or repair.

The engine described in the illustrative example thus far provides 360 horsepower under the hood and a torque of 380 lbs.-ft. thereby ranking with the best on the market today. Acceleration times of 0 to 60 m.p.h. in 7.8 seconds should be realizable along with a top speed of 125 m.p.h. Driving in a conventional style, the automobile has a range of 200 miles in city driving and 350 miles on freeway at a steady 70 m.p.h.

Gaseous hydrogen and oxygen are available from industrial sources of supply in large quantities. Considering the widespread use of hydrogen and oxygen that would result from the general introduction of an automobile of this construction, the generation of hydrogen and oxygen directly by use of electric current in each service station has several advantages over expanding commercial sources of supply. The main advantage would be a completely pollution-free system.

In accordance with another aspect of the present invention, nuclear electrical generating stations providing electricity for the electrolysis of water to produce the desired amount of hydrogen and oxygen for the smog-free car provides such a pollution-free system.

Figure 12:
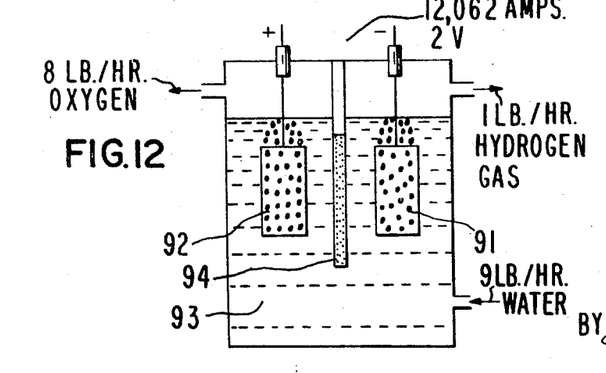
FIG. 12 is an elevational view schematically illustrating an electrolysis apparatus in accordance with the present invention.

In accordance with still another aspect of the present invention, the electrolysis water is utilized to generate the oxygen and hydrogen for the smog-free automobile. Pure oxygen and hydrogen are produced in the precise ratio required for combustion such that water only is formed. FIG. 12 shows the basic components and the quantity relationships of a water electrolyzer. When an electric current flows, bubbles of hydrogen gas form on the cathode plate 91 while bubbles of oxygen gas from at anode 92. A 15 percent to 30 percent solution of potassium hydroxide is used as the electrolyte 93. A woven asbestos diaphragm is placed between the electrodes 91 and 92 to prevent mixing of the gas bubbles but to permit passage of the electrolyte. At the cathode, hydrogen ions receive electrons forming hydrogen gas. Hydroxyl ions are attracted to the anode, give up an electron, and form oxygen gas plus water. The potassium hydroxide is not consumed but is necessary to generate the necessary ions to permit the electric current flow.

In a service station as shown in FIG. 1, the storage tanks need only be adequate to handle peak rates and to minimize use of electric power during peak power periods since gases can be continuously generated. A storage capacity of 200 cubic feet of hydrogen and 100 cubic feet of oxygen is adequate to fuel 25 smog-free cars of the type described above. The cost of this fuel per mile utilizing the smog-free car and this hydrolysis generation of hydrogen and oxygen is approximately the cost per mile for a conventional gasoline engine.

In accordance with still another aspect of the present invention, a smog-free car and method of operating the same is provided wherein gasoline and oxygen, rather than hydrogen and oxygen, are burned to provide maximum efficiency in the 25–50 horsepower range capable of maximum power of 200 horsepower and 250 lbs.-ft. of torque. For purposes of comparison, the engine in accordance with this aspect of the present invention is designed with the same displacement, bore, stroke as the smog-free engine utilizing hydrogen and oxygen described above. The automobile burning gasoline and oxygen operates basically on the same cycle as the hydrogen and oxygen burning automobile but derives its pollution-free potential from completely oxidizing the hydrocarbons in gasoline in absence of nitrogen. Consequently, oxygen rich mixtures can be used to thoroughly oxidize the fuel without the usual production of nitrogen oxides.

Figure 13:
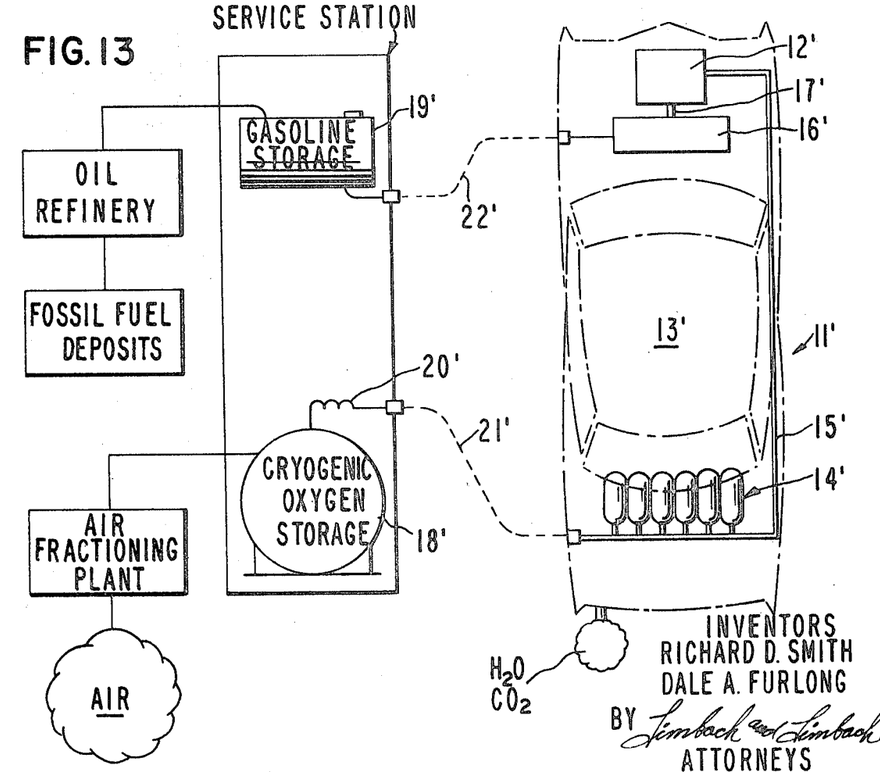
FIG. 13 is a schematic view partially in block diagram form and partially in plan schematically illustrating certain aspects of the present invention.

The gasoline and oxygen burning automobile system is illustrated in FIG. 13 wherein the internal combustion engine 12' as described above and modified in accordance with the description below for burning gasoline and oxygen is located in front of the vehicle 11' along with the gasoline supply 16'. The oxygen supply in a tankage assembly 14' such as that shown in FIG. 9 is located at the rear of the automobile and connected to the engine 12' through a manifold 15'. It will be appreciated that the location of the gasoline supply 16' and the oxygen supply 14' can be reversed so long as they are separated from one another for safety in case of a collision.

The automobile is serviced at a service station having a storage 19' for gasoline obtained from conventional sources and a cryogenic storage 18' for oxygen such as obtained from the air by means of an air fractioning plant. Liquid oxygen in storage 18' is converted to high pressure gaseous oxygen in converter 20' for delivery to the automobile via hoses with quick disconnect fitting.

The operation of the engine in accordance with this embodiment of the present invention conforms generally to the operation described above with reference to FIGS. 3A–3E but wherein liquid gasoline instead of gaseous hydrogen is directed into the cylinder through line 39. The gasoline is burned in a gas mixture with a high oxygen concentration and typically with 15 percent excess oxygen. As a result, at the end of he combustion stroke as shown in FIG. 3A, the hydrocarbons of the gasoline are completely oxidized to water and carbon dioxide. The same dual Otto cycle and Diesel cycle as described above is utilized for cruise powers and maximum powers above cruise level.

Figure 14:
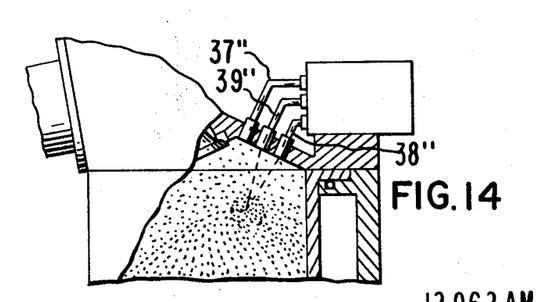
FIG. 14 is an elevational sectional view of a portion of the engine structure in accordance with the embodiment of FIG. 13.

As illustrated in FIG. 14, the gas fuel inlet port 39'' is arranged with respect to he gaseous oxygen inlet port 38'' such that within the cylinder 31' the jet of oxygen from inlet port 38'' hits the stream of liquid gasoline entering through port 39''whereby the gasoline is finely atomized and dispersed throughout the combustion chamber within the cylinder. The gasoline and oxygen are not mixed prior to introduction into the cylinder for reasons of safety.

The graph showing cylinder pressure vs. cylinder volume for the engine burning liquid gasoline and gaseous oxygen is illustrated in FIG. 15 and wherein points 11–16 corresponds respectively with points 1–6 described above with reference to FIG. 4 in setting forth the operation of the engine burning hydrogen and oxygen.

In this embodiment of the invention, the hydrocarbon fuels are burned substantially completely to eliminate carbon monoxide and unburned hydrocarbon. The presence of nitrogen oxide is not possible since no nitrogen is present in the cylinder. When fuels are burned in highly concentrated oxygen environments, intimate contact between fuel molecules and the oxygen molecules is possible. Compared to the combustion of the same fuel in air, the burning rate is increased; the temperature of the products of combustion is higher; and the thoroughness of combustion of the fuel is much easier to obtain.

Since air contains about 78 percent nitrogen and 21 percent oxygen by volume, and 75.8 percent nitrogen 23.2 percent oxygen by weight, the diluting effect of nitrogen can well be appreciated. Nitrogen does not contribute to the oxidation process but acts to dilute the effective oxygen concentration, making it more difficult for an oxygen molecule to find a fuel molecule with which to react. In addition to its role as a dilutant in the chemical reaction between oxygen and the fuel, the nitrogen also acts as a heat sink to absorb the energy released in the chemical reaction. The nitrogen is heated along with the products of the reaction, and because it is present in such large quantities it reduces the maximum temperature of he fuel-air reaction.

As with the engine burning hydrogen and oxygen all of the fuel is introduced prior to ignition for maximum power utilizing the Diesel cycle and an amount of oxygen is introduced consistent with obtaining the maximum chamber pressure used in the cruise portion of the cycle. By introducing all of the fuel prior to ignition, the subsequent burning of the highly fuel rich mixture thoroughly vaporizes the excess fuel and heats it to combustion temperatures. Consequently, when oxygen is finally introduced the fuel will burn quickly and thoroughly.

A curve showing engine efficiency as a function of engine horsepower for the gasoline and oxygen-burning engine is shown in FIG. 5 for an operative embodiment of the invention corresponding to the embodiments given above for the hydrogen and oxygen-burning engine. The difference between the two engine efficiencies is explained by the low molecular weight of water vapor (18) compared to carbon dioxide (44). The gasoline burned in the gasoline-oxygen engine produces carbon dioxide which supplies only 40 percent of the work of water vapor during the expansion process because of the difference in molecular weight. The effect of the carbon dioxide becomes increasingly pronounced as power is increased since the relative percentage of carbon dioxide is similarly increased. At cruise power, the water vapor diluent is more effective in reducing the average molecular weight of the working fluid. As an illustrative example, a gasoline-oxygen burning engine with substantially the same power and capabilities of the hydrogen-oxygen engine described above, requires a 10.6 gallon tank for the gasoline and 55 high pressure tank for the oxygen. Because of the increased number of oxygen tanks, the gas-oxygen burning engine is heavier than the hydrogen-oxygen burning engine.

Since the gasoline-oxygen burning engine does not require the provision of hydrogen as does the hydrogen burning engine, the introduction of the gasoline-oxygen engine powered car is likely to present less of an obstacle because it uses conventional fuel supplies and conventional industrial oxygen supplies.

It will be appreciated that many modifications can be made in the construction as described and illustrated. For example, instead of introducing all the fuel and then only a portion of the oxygen for the maximum power cycle, the oxygen can be introduced first and then the fuel. In the case of gas fuel, this arrangement is especially less attractive since by introducing all the fuel first, all the fuel is heated for better, more uniform combustion.

Although the foregoing invention has been described in some detail by way of illustration and example for purposes of clarity of understanding, it is understood that certain changes and modifications may be practiced within the spirit of the invention as limited only by the scope of the appended claims.

We claim:

1. An air-pollution free automobile comprising:
   a frame,
   a passenger compartment,
   a two-stroke internal combustion engine mounted on said frame including
      at least one cylinder closed at one end,
      a piston reciprocating in said cylinder,
   ports in said cylinder at said one end that are opened and closed cyclically as said piston reciprocates including
      closely spaced apart fuel and oxygen inlet ports,
      a liquid water spray inlet port, and an exhaust port,
   first means for supplying controlled amounts of fuel and substantially pure oxygen as the sole oxidant to said cylinder when said piston is near said one end for producing horsepower to a predetermined level, means for igniting fuel and oxygen for combustion in said cylinder,
   second means for supplying to said cylinder during combustion controlled amounts of fuel or oxygen as the sole oxidant as said piston moves away from said one end for combustion at substantially constant pressure for producing horsepower above said predetermined level,
   means for opening and closing said exhaust port for exhausting combusting products,
   means for supplying a spray of liquid water through said liquid spray inlet port onto said cylinder and said piston during at least a portion of the exhaust cycle,
   means for storing the fuel supply toward one end of said frame from said passenger compartment; and means for storing the oxygen supply toward the other end of said frame from said passenger compartment.

2. The automobile in accordance with claim 1 wherein said fuel-storing means includes
   a plurality of high-pressure gaseous storage tanks, and
   manifold means connecting said tanks to said supplying means.

3. The automobile in accordance with claim 2 wherein substantially every storage tank includes
   valve means preventing rapid gaseous flow from such tank into said manifold, and
   slow bleed valve means permitting slow gaseous bleed from such tank into said manifold.

4. The automobile in accordance with claim 2 wherein each of said storage tanks includes
   a metal liner having a cylindrical main body portion, and
   a cylindrical wrap of fiberglass around said main body portion.

5. The automobile in accordance with claim 1 wherein said storing means includes
   a plurality of cruise gaseous storage tanks for supplying gaseous material for producing horsepower to said predetermined level,
   a first fluid conduit connecting said cruise tanks to said first supplying means and provided with a first pressure reducing regulator means for reducing the gaseous pressure in said first conduit to a first pressure level,
   a plurality of power gaseous storage tanks for supplying gaseous material for producing horsepower above said level,
   a second fluid conduit connecting said power tanks to said second supplying means and provided with a second pressure reducing regulator means for reducing the gaseous pressure in said second conduit to a second pressure level above said first pressure level,
   means providing communication between conduits when the pressure in the first conduit between said cruise tanks and said first regulator falls to said first pressure level or the pressure in said second conduit between said power tanks and said second regulator falls to said second level.

6. The automobile in accordance with claim 1 including means for recovering water from the exhaust through said exhaust port, and
   means for directing the recovered water to said water spray-supplying means.

7. The automobile of claim 1 wherein
   said fuel and oxygen-supplying means includes
   means for injecting fuel gasoline in a stream, and
   means for injecting oxygen into said gasoline stream to atomize gasoline in said cylinder.

8. The automobile of claim 1 wherein said fuel storing means includes a supply of hydrogen.

9. The automobile of claim 1 wherein said fuel storing means includes
   a plurality of high pressure gaseous hydrogen fuel tanks behind the passenger compartment, and
   a plurality of high pressure gaseous oxygen tanks in front of the passenger compartment.

UNITED STATES PATENT OFFICE
CERTIFICATE OF CORRECTION

Patent No. 3,608,660      Dated Sept. 28, 1971

Inventor(s) Richard D. Smith and Dale A. Furlong

It is certified that error appears in the above-identified patent and that said Letters Patent are hereby corrected as shown below:

Col. 1, line 17, "(2development" should read --(2) development--

Col. 4, line 71, "illustrative" should read -- illustrate --;

Col. 5, line 29, "illustration" should read -- illustrative --;

Col. 6, line 13, "8.15:1" should read -- 8.5:1 --;

6, line 48, "v-8" should read -- V-8 --;

Col. 7, line 14, "tool" should read -- total --;

7, line 75, "15" should read -- 75 --;

Col. 8, line 63, "truck" should read -- trunk --;

Col. 9, line 8, "45 percent" should read -- 47 percent --;

9, line 52, "from" should read -- form --;

Col. 10, line 29, "fractioning" should read -- fractionating --;

10, line 46, "he" should read -- the --.

Signed and sealed this 9th day of May 1972.

(SEAL)
Attest:

EDWARD M. FLETCHER, JR.            ROBERT GOTTSCHALK
Attesting Officer                        Commissioner of Patents